(12) United States Patent
Patterson et al.

(10) Patent No.: US 7,739,957 B2
(45) Date of Patent: Jun. 22, 2010

(54) HYBRID GAS GENERATOR

(75) Inventors: Donald B. Patterson, Rochester, MI (US); Bruce A. Stevens, Oakland, MI (US)

(73) Assignee: TK Holdings, Inc., Armada, MI (US)

(*) Notice: Subject to any disclaimer, the term of this patent is extended or adjusted under 35 U.S.C. 154(b) by 0 days.

(21) Appl. No.: 12/006,196

(22) Filed: Dec. 31, 2007

(65) Prior Publication Data
US 2008/0156223 A1 Jul. 3, 2008

Related U.S. Application Data

(60) Provisional application No. 60/878,035, filed on Dec. 29, 2006.

(51) Int. Cl.
*C06D 5/00* (2006.01)
(52) U.S. Cl. ........... 102/531; 137/199; 128/204.18; 123/41.86; 280/736; 280/737; 141/1
(58) Field of Classification Search ........ 137/199; 128/204.18; 123/41.86; 280/736, 737; 141/1; 102/531
See application file for complete search history.

(56) References Cited

U.S. PATENT DOCUMENTS

| | | | |
|---|---|---|---|
| 4,751,940 A | 6/1988 | Bergsma et al. ........ 137/199 |
| 5,002,050 A | 3/1991 | McGinnis ........... 128/204.18 |
| 5,067,449 A | 11/1991 | Bonde ................ 123/41.86 |
| 5,738,371 A * | 4/1998 | Blackshire et al. ........ 280/736 |
| 5,820,160 A * | 10/1998 | Johnson et al. ........... 280/736 |
| 5,820,162 A * | 10/1998 | Fink .................... 280/742 |
| 5,882,036 A | 3/1999 | Moore et al. ........... 280/736 |
| 6,012,737 A * | 1/2000 | Van Wynsberghe et al. . 280/737 |
| 6,145,876 A * | 11/2000 | Hamilton ............... 280/736 |
| 6,170,868 B1 | 1/2001 | Butt et al. ............. 280/737 |
| 7,131,663 B1 | 11/2006 | Campbell et al. ......... 280/737 |
| 2003/0111831 A1* | 6/2003 | Horton et al. ........... 280/736 |
| 2005/0062272 A1* | 3/2005 | Smith et al. ............ 280/737 |
| 2006/0201572 A1* | 9/2006 | Matsuda et al. ........... 141/1 |
| 2006/0255577 A1 | 11/2006 | Nakayasu et al. ......... 280/737 |
| 2007/0085309 A1 | 4/2007 | Kelley et al. ............ 280/736 |

* cited by examiner

Primary Examiner—Troy Chambers
Assistant Examiner—Samir Abdosh
(74) Attorney, Agent, or Firm—L.C. Begin & Associates, PLLC.

(57) ABSTRACT

An inflator 10 of the present invention contains: a housing 12, a cold gas chamber 16 within the housing 12 for storage of a stored gas supply, a pyrotechnic chamber 18 within the housing 12, a pyrotechnic charge 20 within the pyrotechnic chamber 18, a wall 22 adjoining the cold gas and the pyrotechnic chambers 16, 18, a first orifice 24 defined in the wall 22 for passage of gas between the chambers, and a perforated flexible member 28 contained within the cold gas chamber 16, wherein the flexible member 28 is fixed about the orifice 24 for modulation or controlled variation of gas flow through the orifice 24.

10 Claims, 2 Drawing Sheets

HYBRID GAS GENERATOR

CROSS-REFERENCE TO RELATED APPLICATIONS

The present application claims the benefit of U.S. Provisional Application Ser. No. 60/878,035 having a filing date of Dec. 29, 2006.

TECHNICAL FIELD

The present invention relates generally to pyrotechnic gas generators for inflatable restraint devices, and more particularly to such a gas generating system having a low pressure, low temperature liquefied gas hybrid inflator.

BACKGROUND OF THE INVENTION

Inflatable restraint systems or "airbag" systems have become a standard feature in many new vehicles. These systems have made significant contributions to automobile safety, however, as with the addition of any standard feature, they increase the cost, manufacturing complexity and weight of most vehicles. Technological advances addressing these concerns are therefore welcomed by the industry. In particular, the quality of the gaseous effluent from the gas generators has led to the investigation of the use of non-cryogenic gases, such as di-nitrogen monoxide (nitrous oxide or NO2) and carbon dioxide. In turn, the use of these gases sometimes implicates the issues of low temperature performance and low gas pressure output. Accordingly, improving the output by heating and pressurizing the gas or gas source while maintaining a low gas exit flow area for sustained gas release would be an improvement in the art, thereby increasing the utility of these non-cryogenic gases.

SUMMARY OF THE INVENTION

In accordance with the foregoing and other objects of the invention, a low pressure, low temperature liquefied gas hybrid inflator for an occupant restraint system is provided. The inflator includes a pyrotechnic section and a cold gas section that are separated by a burst shim rupturable upon activation of the pyrotechnic charge within the inflator. A perforated flexible member or compensation device is fixed about the interface of the cold gas and pyrotechnic sections to modulate the flow of gases into and out of each section, primarily the cold gas section. As the pyrotechnic section is activated, the hot gases pour through the orifice created by the burst shim and into the cold gas/stored gas portion of the gas generator to heat the cold stored two-phase "gases" (e.g. gas and liquid). A flexible member or compensation device is biased from a concave to a convex orientation, relative to the orifice, thereby permitting a relatively greater amount of hot gases into the cold gas section immediately after actuation of the pyrotechnic section.

The hot gases are controllably introduced into the cold gas section to increase the pressure and heat within the cold gas section of the inflator. As the pressure differential is reversed between the pyrotechnic and cold gas sections over time, the flexible member again resumes a concave orientation about the orifice, and the now-hot gases within the cold gas section are then shunted back through an orifice on the flexible member and into the pyrotechnic section. The gases then routed through gas exit burst shims and associated gas exit orifices within the pyrotechnic section, and then out of the hybrid inflator.

In sum, an inflator of the present invention contains: a housing, a cold gas chamber within the housing for storage of a stored gas supply, a pyrotechnic chamber within the housing, a pyrotechnic charge within the pyrotechnic chamber, a wall adjoining the cold gas and the pyrotechnic chambers, a gas orifice defined in the wall for passage of gas between the chambers, and a perforated flexible member contained within the cold gas chamber, wherein the flexible member is fixed about the orifice for modulation or controlled variation of gas flow through the orifice.

DETAILED DESCRIPTION OF THE INVENTION

Figure 1:
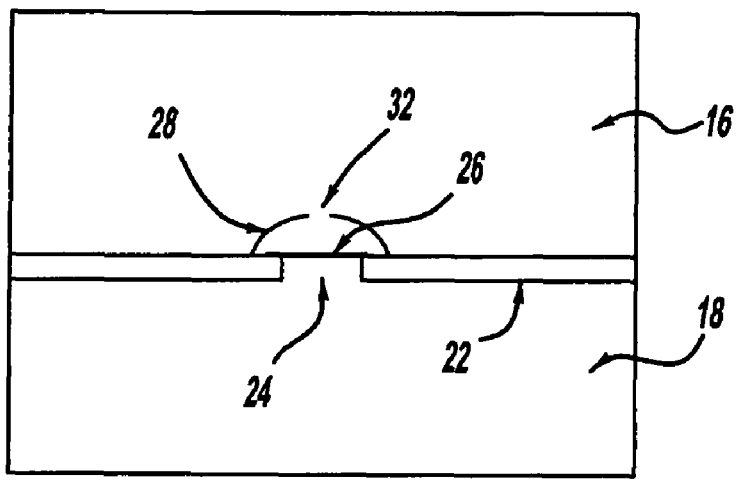
FIG. 1 is a schematic view of the interface between the cold gas section and the pyrotechnic section prior to actuation of the hybrid inflator.

An inflator 10 of the present invention includes a perforated housing 12 containing gas exit orifices 14. A first chamber 16 within the housing 12 contains a stored gas supply, such as a compressed two-phase liquid/gas supply. A second chamber 18 contains a known pyrotechnic gas generant or charge 20 for producing gases upon actuation of the inflator 10. The gas generant charge 20 may be formed for example as exemplified in U.S. Pat. No. 5,035,757, herein incorporated by reference in its entirety. A wall 22 adjoins both the first and second chambers 16, 18 and is formed there between. A first orifice 24 is formed or defined in the wall 22 for passage of gases between the chambers as described herein.

In accordance with the present invention, a flexible disc or membrane 28 such as a Bellville washer or a bimetallic disc is fixed in close proximity to a first burst shim 26 and associated first orifice 24. The disc 28 may be spot-welded or otherwise fixed to the wall 22 thereby permitting hot gas flow there through upon pyrotechnic actuation without attenuating the flexible nature of the flexible member/disc 28. It should be appreciated that the flexible member, flexible disc, or flexible compensation device 28 maintains a concave seal and orientation above and relative to the burst shim 26 and orifice 24 prior to pyrotechnic actuation. Upon pyrotechnic actuation, the burst shim 26 ruptures thereby permitting hot gases to enter the first chamber 16 from the second chamber 18, and by virtue of the flexibility of the compensation device or Bellville washer 28, the outer periphery of the compensation device 28 is biased to present a convex orientation of the flexible disc/Bellville washer 28. This permits rapid heating of the stored gas by the hot gases pouring past the raised periphery 30 of the compensation device/flexible disc 28.

As the pressure differential existing between the pyrotechnic section 18 and the stored gas section 16 equalizes over time by virtue of hot gases passing into the stored gas section 16, and as the pressure presented by the hot gases entering into the stored liquid/gas chamber 16 is reduced, the resilient spring properties of the Bellville washer/flexible disc/compensation device again presents a concave orientation to the burst shim orifice thereby sealing the gas passage previously provided about the periphery 30 of the compensation device 28. At this point, a control orifice 32 provided in the Bellville washer/flexible disc/compensation device now provides a controlled flow of a mixture of hot pyrotechnic gas and stored gas from the stored gas section 16 through the control orifice 32, then through the first orifice 24, back into the pyrotechnic section 18, and out associated gas exit orifices 14 provided in the perforated housing 12. It should be appreciated that gas exit burst shims 34 provided adjacent the gas exit orifices 14 in a known manner are now rupturable based on the increased amount of gas pressure resulting from the additive pressure of the stored and pyrotechnic combined gases. It should further be appreciated that the first burst shim 26 initially covering the first orifice 24 providing fluid communication between the pyrotechnic and stored gas chambers 16, 18 of the inflator 10 is designed to rupture at a lower pressure than that of the burst shims 34 of the gas exit orifices 14 thereby ensuring sequential operation and mixing of gases as described above, prior to the gas exiting through the gas exit orifices 14 of the inflator 10.

It should be appreciated that the inflator 10 is structured in a known manner as will be appreciated by those of ordinary skill. For example, U.S. Pat. No. 7,131,663, US2006/0255577, US2006/0201572, and US2006/0249938, herein incorporated by reference, exemplify, but do not limit proposed construction of various constituents of the present inflator 10 as known in the art. Nevertheless, the present improvement involving the utilization of the compensation device 28 lies in the ability to introduce hot gases to the stored gas supply, such as a two-phase gas supply, in a controlled manner, thereby controllably increasing the pressure within the hybrid inflator 10. Furthermore, the improvement further lies in the ability to control the gas exit due to attenuating the gas pressure through the compensation device 28 as it exits the inflator 10 through the pyrotechnic section 18. The operation of the present hybrid inflator is illustrated in FIGS. 1-3 included herewith.

Figure 2:
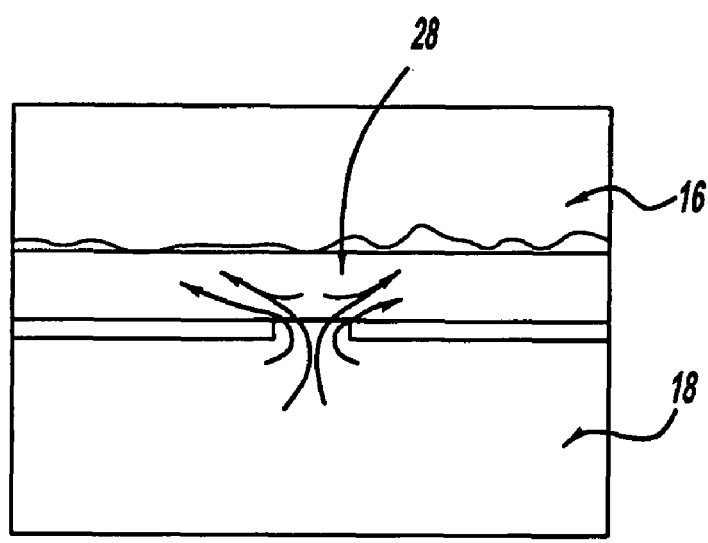
FIG. 2 is a schematic view of the interface between the cold gas section and the pyrotechnic section immediately after actuation of the hybrid inflator.

As shown in FIG. 1, prior to gas generator or inflator 10 actuation, the perforated flexible member 28 forms a concave partial seal or maintains a concave orientation relative to the gas orifice 24 that ultimately provides gas flow between the cold gas section 16 and the pyrotechnic section 18 of the inflator 10. As shown in FIG. 2, immediately upon inflator actuation, the hot gases produced by actuation of the pyrotechnic section 18 rupture the burst shim 26 and are forcibly introduced into the cold gas section 16. As shown in FIG. 2, the high pressure of the hot gases causes the flexible member 28 to present a convex orientation relative to the orifice, due primarily to the resilient and spring-like properties of the flexible member or compensation device 28. As the flexible member 28 takes on a convex orientation relative to the orifice 24, a greater volume of hot gases is permitted entry into the stored gas or first chamber 16 as the relative passageway is increased.

Figure 3:
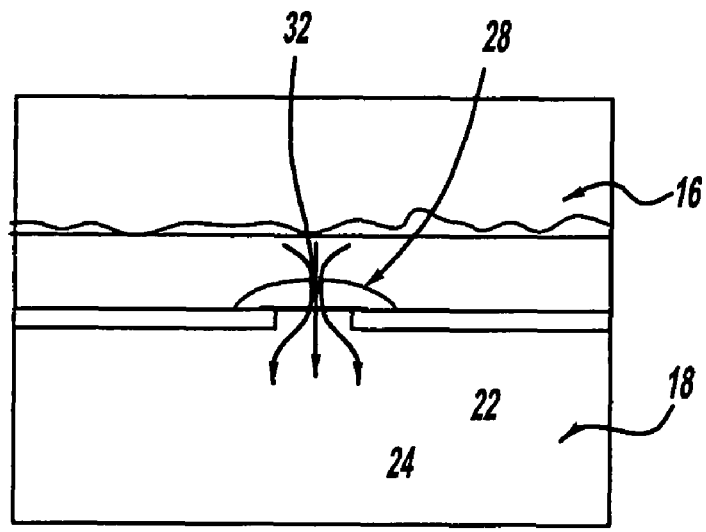
FIG. 3 is a schematic view of the interface between the cold gas section and the pyrotechnic section as the pressure within the cold gas section exceeds that within the pyrotechnic section of the hybrid inflator.

As shown in FIG. 3, once the pressure within the first chamber or cold gas chamber 16 exceeds or at least approximates that of the pyrotechnic chamber 18, the flexible member 28 reverts back to the concave orientation about the orifice 24, thereby attenuating the fluid flow through the flexible member 28, then through the orifice 24, then through the pyrotechnic chamber 18, and then out of the inflator 10. Accordingly, the flexible member 28 not only functions to permit relatively greater amounts of hot gases into the first chamber or stored gas chamber 16 as shown in FIG. 2, but it also functions to reduce the flow rate of hot gases from the stored gas chamber 16 back into the pyrotechnic chamber 18 and out the inflator 10. Stated another way, the flexible member 28, due to its flexible and resilient spring-like properties, is employed to "modulate" the flow of gases back and forth through the orifice 24 as the relative shape of the flexible member 28 changes from concave to convex and back to concave throughout the operation of the inflator 10.

Figure 4:
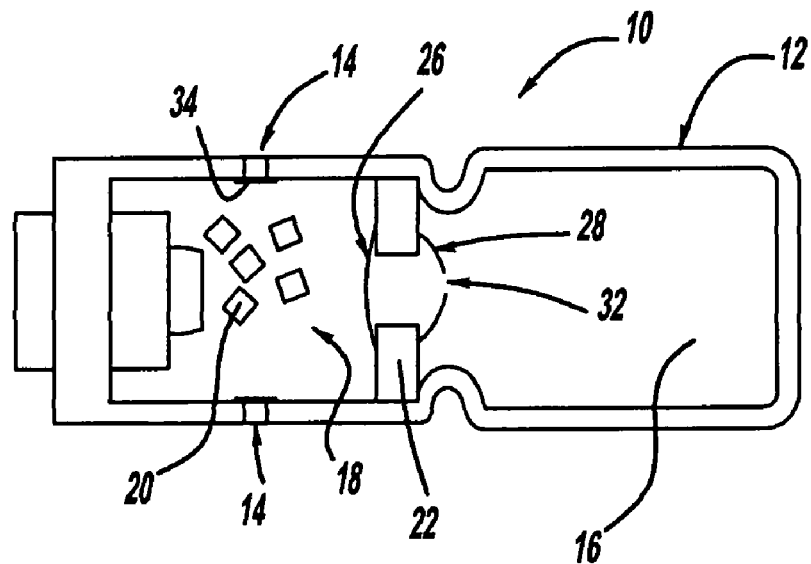
FIG. 4 is an exemplary hybrid inflator containing the flexible member/compensation device in accordance with the present invention.

As shown in FIG. 4, an exemplary inflator or gas generating system 10 formed as described herein, may be manufactured as known in the art. U.S. Pat. No. 7,131,663, US2006/0255577, US2006/0201572, and US2006/0249938, exemplify typical airbag hybrid inflator designs and are each incorporated herein by reference in their entirety.

Figure 5:
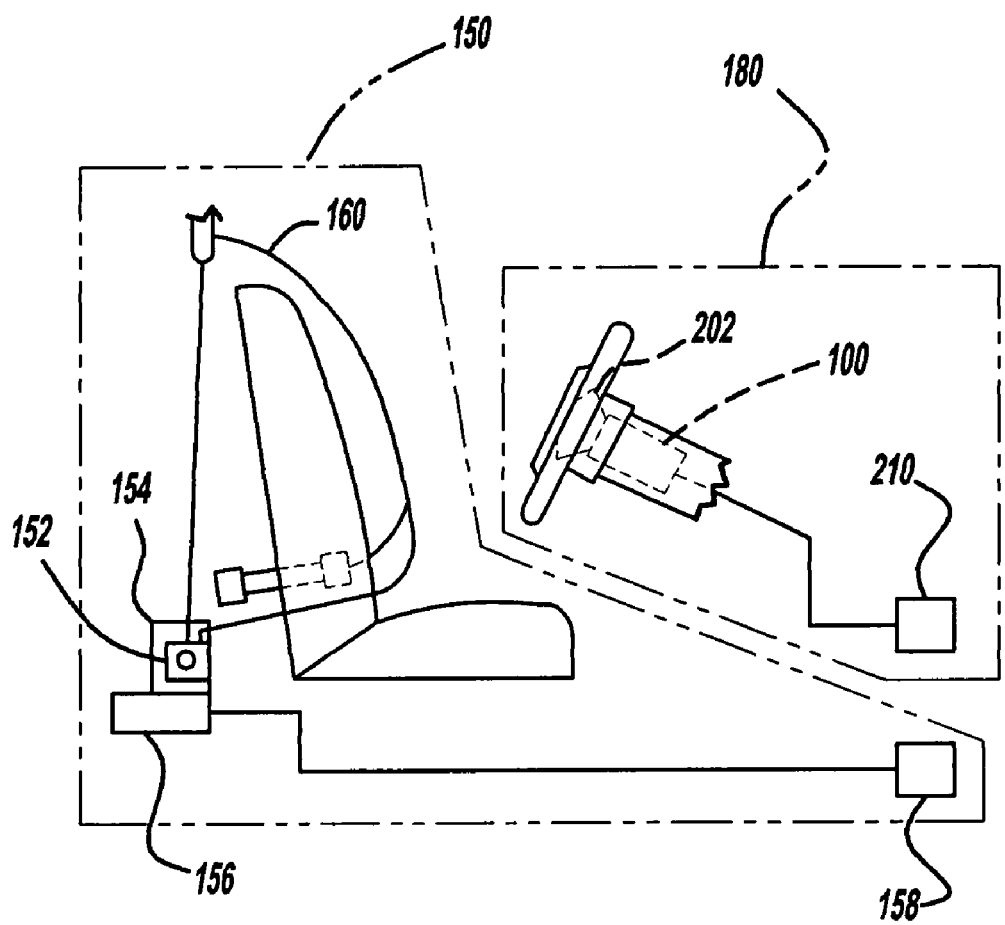
FIG. 5 is a schematic view of a vehicle occupant protection system containing a hybrid inflator in accordance with the present invention.

Referring now to FIG. 5, the exemplary inflator or gas generating system 10 described above may also be incorporated into an airbag system 200. Airbag system 200 includes at least one airbag 202 and an inflator 10 in accordance with the present invention, coupled to airbag 202 so as to enable fluid communication with an interior of the airbag. Airbag system 200 may also include (or be in communication with) a crash event sensor 210. Crash event sensor 210 includes a known crash sensor algorithm that signals actuation of airbag system 200 via, for example, activation of airbag inflator 10 in the event of a collision.

Referring again to FIG. 5, airbag system 200 may also be incorporated into a broader, more comprehensive vehicle occupant restraint system 180 including additional elements such as a safety belt assembly 150. FIG. 2 shows a schematic diagram of one exemplary embodiment of such a restraint system. Safety belt assembly 150 includes a safety belt housing 152 and a safety belt 100 extending from housing 152. A safety belt retractor mechanism 154 (for example, a spring-loaded mechanism) may be coupled to an end portion of the belt. In addition, a safety belt pretensioner 156 containing gas generating/auto ignition composition 12 may be coupled to belt retractor mechanism 154 to actuate the retractor mechanism in the event of a collision. Typical seat belt retractor mechanisms which may be used in conjunction with the safety belt embodiments of the present invention are described in U.S. Pat. Nos. 5,743,480, 5,553,803, 5,667,161, 5,451,008, 4,558,832 and 4,597,546, incorporated herein by reference. Illustrative examples of typical pretensioners with which the safety belt embodiments of the present invention may be combined are described in U.S. Pat. Nos. 6,505,790 and 6,419,177, incorporated herein by reference.

Safety belt assembly 150 may also include (or be in communication with) a crash event sensor 158 (for example, an inertia sensor or an accelerometer) including a known crash sensor algorithm that signals actuation of belt pretensioner 156 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

It should be appreciated that safety belt assembly 150, airbag system 200, and more broadly, vehicle occupant protection system 180 exemplify but do not limit gas generating systems contemplated in accordance with the present invention.

It should further be understood that the preceding is merely a detailed description of various embodiments of this invention and that numerous changes to the disclosed embodiments can be made in accordance with the disclosure herein without departing from the scope of the invention. The preceding description, therefore, is not meant to limit the scope of the invention. Rather, the scope of the invention is to be determined only by the appended claims and their equivalents.

What is claimed is:

1. An inflator comprising:
a housing:
a cold gas chamber within said housing for storage of a stored gas supply;
a pyrotechnic chamber within said housing;
a pyrotechnic charge within said pyrotechnic chamber;
a wall adjoining said cold gas chamber and said pyrotechnic chamber;
a gas orifice defined in said wall for passage of gas between said chambers;
a burst disc covering said gas orifice prior to inflator operation; and
a perforated flexible member contained within said cold gas chamber,
wherein said flexible member is fixed about said orifice, and presents both a concave and convex shape during operation of said inflator, for modulation of gas flow through said orifice.

2. The inflator of claim 1 wherein said perforated flexible member is a flexible disc.

3. The inflator of claim 1 wherein said perforated flexible member is a flexible washer.

4. A vehicle occupant protection system containing the inflator of claim 1.

5. An inflator comprising:
a housing containing a first chamber containing a stored gas supply and a second chamber containing a pyrotechnic gas generant;
a wall adjoining said first and second chambers;
an orifice defined in said wall for passage of gas there through;
a burst disc covering said gas orifice prior to inflator operation; and
a perforated flexible member fixed about said orifice for modulating gas flow through said orifice,
wherein upon actuation of said inflator, hot gases flow through said orifice at variable flow rates.

6. A vehicle occupant protection system containing the inflator of claim 5.

7. An inflator comprising:
a perforated housing containing a first chamber containing a stored gas supply and a second chamber containing a pyrotechnic gas generant;
a wall adjoining and between said first and second chambers;
an orifice defined in said wall for fluid flow between said first and second chambers;
a burst disc covering said gas orifice prior to inflator operation; and
a perforated flexible member within said first chamber and fixed about said orifice for modulating gas flow through said orifice, said flexible member forming a concave seal about said orifice prior to inflator actuation,
wherein upon actuation of said inflator, hot gases from said second chamber flow through said orifice and into said first chamber and bias the flexible member to form a convex orientation about said orifice, and then hot gases bias the perforated flexible member to again form a concave seal about said orifice, whereby gas flows through said flexible member, then trough said orifice and into said second chamber, then out of said perforated housing.

8. The inflator of claim 1 wherein said flexible member is a flexible washer.

9. A vehicle occupant protection system containing the inflator of claim 7.

10. An inflator comprising:
a housing;
a cold gas chamber within said housing for storage of a stored gas supply;
a pyrotechnic chamber within said housing;
a pyrotechnic charge within said pyrotechnic chamber;
a gas orifice defined in said wall for passage of gas between said chambers;
a burst disc covering said gas orifice prior to inflator operation; and
a perforated flexible member contained within said cold gas chamber,
wherein said perforated flexible member is fixed over said orifice for modulation of gas flow through said orifice.

* * * * *

UNITED STATES PATENT AND TRADEMARK OFFICE
CERTIFICATE OF CORRECTION

PATENT NO. : 7,739,957 B2
APPLICATION NO. : 12/006196
DATED : June 22, 2010
INVENTOR(S) : Patterson et al.

It is certified that error appears in the above-identified patent and that said Letters Patent is hereby corrected as shown below:

Column 4; Line 12; delete "No." and insert --and Application Nos.--

Column 6; Claim 7; line 21; delete "trough" and insert --through--

Signed and Sealed this

Sixteenth Day of November, 2010

David J. Kappos
*Director of the United States Patent and Trademark Office*